United States Patent [19]
Connolly

[11] Patent Number: 5,649,791
[45] Date of Patent: Jul. 22, 1997

[54] APPARATUS AND METHOD FOR BORING A HOLE IN A BROKEN BOLT

[76] Inventor: Matthew Connolly, 905 G. Line St., Easton, Pa. 18042

[21] Appl. No.: 243,271

[22] Filed: May 17, 1994

[51] Int. Cl.$^6$ .................... B23B 35/00; B23B 49/00
[52] U.S. Cl. .................... 408/1 R; 408/72 B; 408/80; 408/115 B; 408/241 B
[58] Field of Search ............... 408/72 B, 79, 408/80, 115 B, 115 R, 1 R, 241 B; 81/53.2

[56] References Cited

U.S. PATENT DOCUMENTS

| | | | |
|---|---|---|---|
| 1,009,248 | 11/1911 | Jenkins et al. | |
| 1,458,076 | 6/1923 | Potts | |
| 1,547,944 | 7/1925 | Murphree | |
| 1,597,468 | 8/1926 | Holehouse | 408/79 |
| 2,121,197 | 6/1938 | Jackman | 81/71 |
| 2,165,485 | 7/1939 | Jackman | 408/67 |
| 2,281,164 | 4/1942 | Maling | 81/53 |
| 2,684,526 | 7/1954 | Hoover | 29/401 |
| 2,694,328 | 11/1954 | LaFreniere | 81/53 |
| 2,744,311 | 5/1956 | Nipken et al. | 29/240 |
| 2,744,312 | 5/1956 | Conger | 29/256 |
| 2,917,331 | 12/1959 | Baer et al. | 408/72 B |
| 3,587,363 | 6/1971 | Rogers | 81/53.2 |
| 3,727,491 | 4/1973 | Buckwalter | 81/53.2 |
| 3,768,918 | 10/1973 | Bethke | 408/72 B |
| 3,913,427 | 10/1975 | Brase | 81/53.2 |
| 4,138,909 | 2/1979 | Johnson | 81/53.2 |
| 4,192,205 | 3/1980 | Dorosh | 81/53.2 |
| 4,445,264 | 5/1984 | Banerian | 408/241 B |
| 4,713,990 | 12/1987 | Poling | 81/53.2 |
| 4,759,666 | 7/1988 | Grab | 408/241 B |
| 4,831,902 | 5/1989 | McClure | 81/53.2 |
| 5,031,487 | 7/1991 | Polonsky | 81/53.2 |
| 5,125,144 | 6/1992 | Clark | 29/240 |
| 5,251,516 | 10/1993 | Desaulniers | 81/53.2 |
| 5,388,933 | 2/1995 | Dunbar | 408/72 B |

FOREIGN PATENT DOCUMENTS

908550  2/1982  U.S.S.R. .................... 408/79

*Primary Examiner*—Daniel W. Howell
*Attorney, Agent, or Firm*—Eric A. LaMorte

[57] ABSTRACT

A device and associated method for drilling a hole in the center of a broken element that is engaged within a bore, thereby enabling the broken element to be retracted by engaging the newly drilled hole. The present invention includes a collar member that defines an open central channel between two opposite ends. The collar member includes a male region adapted to engage the bore should the broken element be broken within the bore below the surface. The collar assembly also includes a female region adapted to engage the broken element, should the broken element extend out of the bore. Regardless of whether the male region engages the bore or the female region engages the broken element, the collar member aligns the open central channel over the center of the broken element. A drill bit is then advanced through the open central channel, whereby the open central channel acts as a drill guide and prevents the drill bit from wandering away from the center of the broken element.

13 Claims, 7 Drawing Sheets

APPARATUS AND METHOD FOR BORING A HOLE IN A BROKEN BOLT

BACKGROUND OF THE INVENTION

I. Field of the Invention

The present invention relates to devices that can be used to bore a hole in the center of a broken bolt so that an extractor device can engage the broken bolt and remove it from the threaded aperture in which it lays. More specifically, the present invention relates to a device that can be used to bore a hole in a broken bolt regardless of whether the bolt has broken above or below the open end of the threaded aperture in which the bolt lays.

II. Prior Art Description

When a bolt is over-torqued in a threaded aperture, cross-threaded or driven into a non-compatible threaded aperture, it is common for the drive head of the bolt to break off of the shaft of the bolt. This is especially common when power wrenches are used to drive the bolt since the power wrench can break the bolt before the operator realizes that an over torque condition exists. Tool elements that break in a bore occur in other machining operations such as tapping threads into a bore, reaming a bore, drilling a bore or the like. In such situations hardened tools are used that easily fracture if they are over-torqued or otherwise heavily stressed. Accordingly, it is very common to have a tap, reamer or drill bit break in a bore.

When a bolt, tap, reamer, drill bit or other such tool breaks in a bore, the tool either breaks at a point below the surface containing the bore or at a point above the surface containing the bore. The techniques used in removing a broken element either above or below the surface of the bore often differ greatly and traditionally require different tools.

When a broken element extends well above the surface containing the bore, the broken element can simply be engaged with a wrench or pliers and turned. If the broken element is threaded, a locking nut can be threaded onto the shaft of the element, followed by a drive nut. The locking nut is used to hold the drive nut in place and the drive nut is turned with a wrench, thereby unthreading the broken element.

However, when a broken element is broken below the surface containing the bore or at a point very close to the surface, the methods used to remove the broken element become far more complex. One of the oldest methods of removing a broken element involves drilling a hole down the center of the broken element, driving a spline or reamer into the newly formed hole and turning the spline or reamer to unthread the broken element. Such methods and devices are exemplified by U.S. Pat. No. 1,458,076 to Potts, entitled EXTRACTING DEVICE; U.S. Pat. No. 2,684,526 to Hoover, entitled METHOD FOR BACKING OFF BROKEN STUDS; and U.S. Pat. No. 2,121,197 to Jackman, entitled SCREW EXTRACTOR. From these references, it should be seen that once a hole is drilled down the center of a broken element, there are many devices that can be used to quickly and easily unthread the broken element. The hard part of removing a broken element from a bore is drilling the hole down the center of the broken element.

When a bolt, tap, reamer, drill bit or the like breaks in a bore, the surface at the point of breakage is rarely flat. Furthermore, the metal used in the bolt, tap, reamer or drill bit is typically hardened. As a result, it is very difficult to drill a hole in the broken element without the drill bit walking across the surface of the broken element and drilling into the bore wall. To prevent the drill bit from wandering in such a manner, a starting depression is typically made in the broken element with a pointed punch. This operation requires a punch of the proper size and requires a great deal of time and skill to be performed properly. The process is especially difficult for broken elements with narrow diameters that are broken at points deep within the bore.

U.S. Pat. No. 4,831,902 to McClure, entitled BROKEN BOLT EXTRACTOR, shows a prior art device usable for removing a broken element of a comparatively large diameter. The device includes a threaded member with a plurality of off-axis longitudinal holes formed therethrough. The off-axis holes are used to guide a drill bit as the drill bit drills into the broken element. Rods are then passed through the holes into the broken element, whereby the rods join the broken element to the threaded member. The broken element is then removed by engaging and turning the threaded member. The disadvantage of this prior art system is that it is highly complex and difficult to use. Furthermore, the system can only be used on bolts broken well below the surface bore, and the presence of the drill bits within the threaded member damages the threaded member creating a relatively short useful life for the device.

Recognizing the inherent difficulties in drilling holes in broken elements, other systems have been developed that do not require the drilling of holes. One such method includes welding a drive nut member to the broken element. Such devices and methods are exemplified by U.S. Pat. No. 5,125,144 to Clark, entitled EXTRACTOR FOR BROKEN-OFF TAPS AND THE LIKE AND METHOD OF EXTRACTING THE SAME, and U.S. Pat. No. 4,138,909 to Johnson, entitled BOLT EXTRACTOR. In both of these references, a guide is placed into the bore in which the broken element is located. A welding electrode is then passed through the guide and is used to weld the guide to the broken element. The disadvantage of this system is that it requires specialized welding equipment. Also, the bore may be damaged by the heat of the weld and there remains the possibility that the broken element may become permanently welded into place within the bore.

Accordingly, although the process of drilling a hole in a broken element has its disadvantages, it is still the preferred method used in the art. To simplify the methods of drilling a hole in a broken element and engaging the hole with a reamer, drill bits and reamers have been combined into single extraction devices. Such a device is exemplified by U.S. Pat. No. 5,031,487 to Polonsky, entitled BROKEN BOLT EXTRACTOR. In this device a flange is placed over the bore that contains the broken element. A reamer engages the flange as a bit drills a hole in the broken element. The flange is then removed and the reamer engages the hole made by the bit. The disadvantages of this device is that it is very expensive to manufacture and both the reamer and bit must be sized to match the broken element. Accordingly, such a device can only be used on broken elements that are broken within the bore at a point below the surface containing the bore.

A need therefore exists in the art for a device that can be quickly and easily used to create a hole in a broken element regardless of whether that broken element extends out of a bore or not.

There also exists a need in the art for a broken element extractor that is inexpensive and adaptable to a wide range of broken element diameters.

SUMMARY OF THE INVENTION

The present invention is a device and associated method for drilling a hole in the center of a broken element that is engaged within a bore, thereby enabling the broken element to be retracted by engaging the newly drilled hole. The present invention includes a collar member that defines an open central channel between two opposite ends. The collar member includes a male region adapted to engage the bore should the broken element be broken within the bore below the surface. The collar assembly also includes a female region adapted to engage the broken element, should the broken element extend out of the bore. Regardless of whether the male region engages the bore or the female region engages the broken element, the collar member aligns the open central channel over the center of the broken element. A drill bit is then advanced through the open central channel, whereby the open central channel acts as a drill guide and prevents the drill bit from wandering away from the center of the broken element. Once the hole is drilled in the center of the broken element, the collar member is removed and the broken element is removed by a second device that engages the hole newly drilled in the center of the broken element.

BRIEF DESCRIPTION OF THE DRAWINGS

For a better understanding of the present invention, reference is made to the following description of two exemplary embodiments thereof, considered in conjunction with the accompanying drawings, in which.

DETAILED DESCRIPTION OF THE PRESENT INVENTION

Although the present invention can be used to remove any broken tool from a bore, such as a tap, reamer, drill bit, dowel or the like, the present invention is especially suited to remove a broken bolt from a threaded bore. Accordingly, the present invention will be described in conjunction with removing a broken bolt from a threaded bore so as to set forth the best mode of the present invention.

Figure 1:
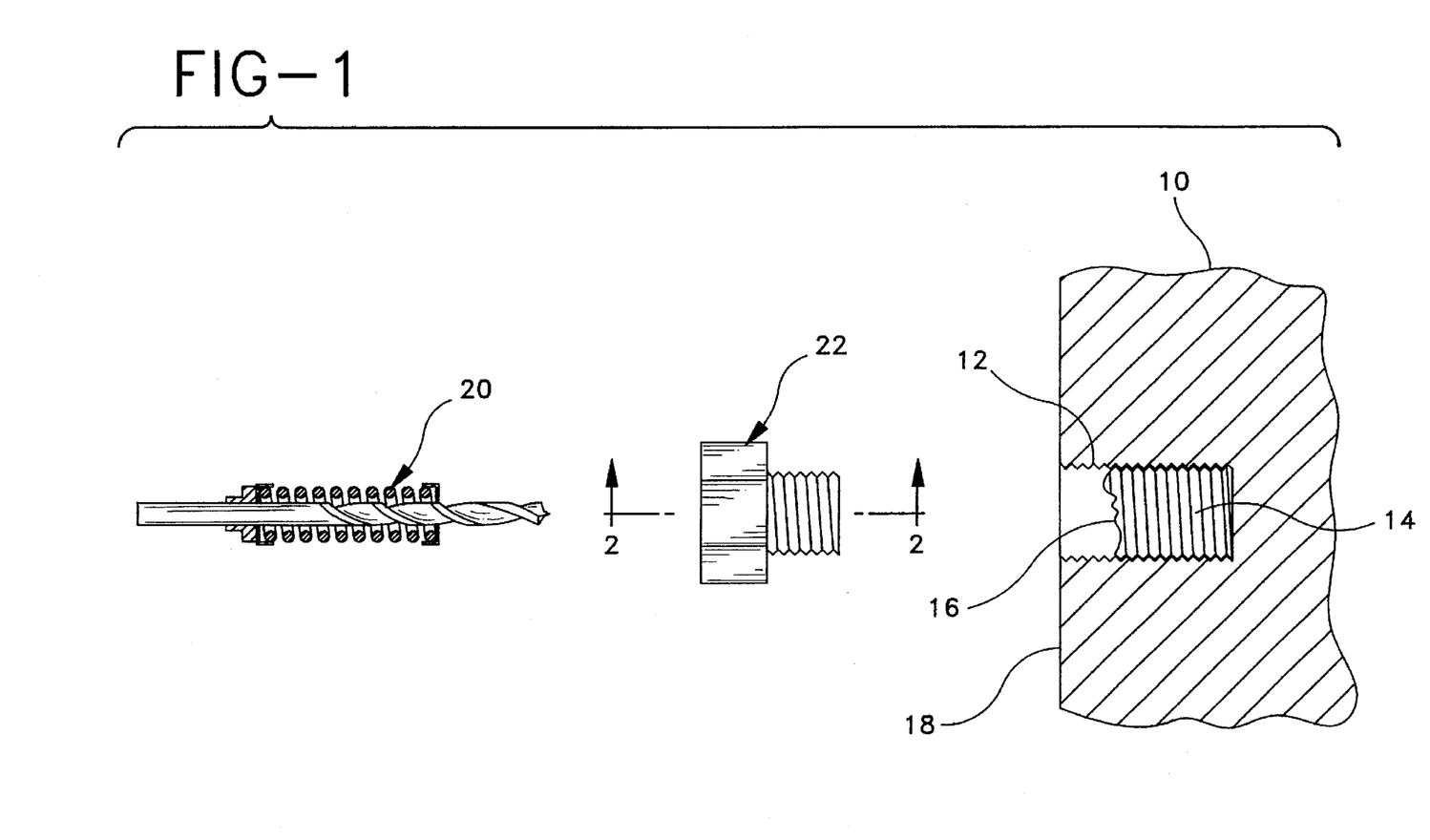
FIG. 1 is an exploded view of one preferred embodiment of the present invention, shown in conjunction with an object that defines a bore, wherein an element is broken within the bore.

Referring to FIG. 1, there is shown an object 10 that defines a threaded bore 12. A broken bolt 14 is disposed within the threaded bore 12, having a top surface 16 that is located below the face surface 18 of the object 10. The present invention includes a drill bit assembly 20 and a collar member 22. As will be later explained, the collar member 22 engages the threaded bore 12 and acts as a guide for the drill bit assembly 20. The collar member 22 guides the drill bit assembly 20 into a predetermined orientation whereby the drill bit assembly 20 is capable of drilling a hole down the center of the broken bolt 14. The hole can be drilled in the broken bolt 14 without any preparation, such as guide depressions, being formed in the top surface 16 of the broken bolt 14. Once a hole is formed within the broken bolt 14, the broken bolt 14 can be removed from the threaded bore 12 utilizing a spline, reamer or other prior art device.

Figure 2:
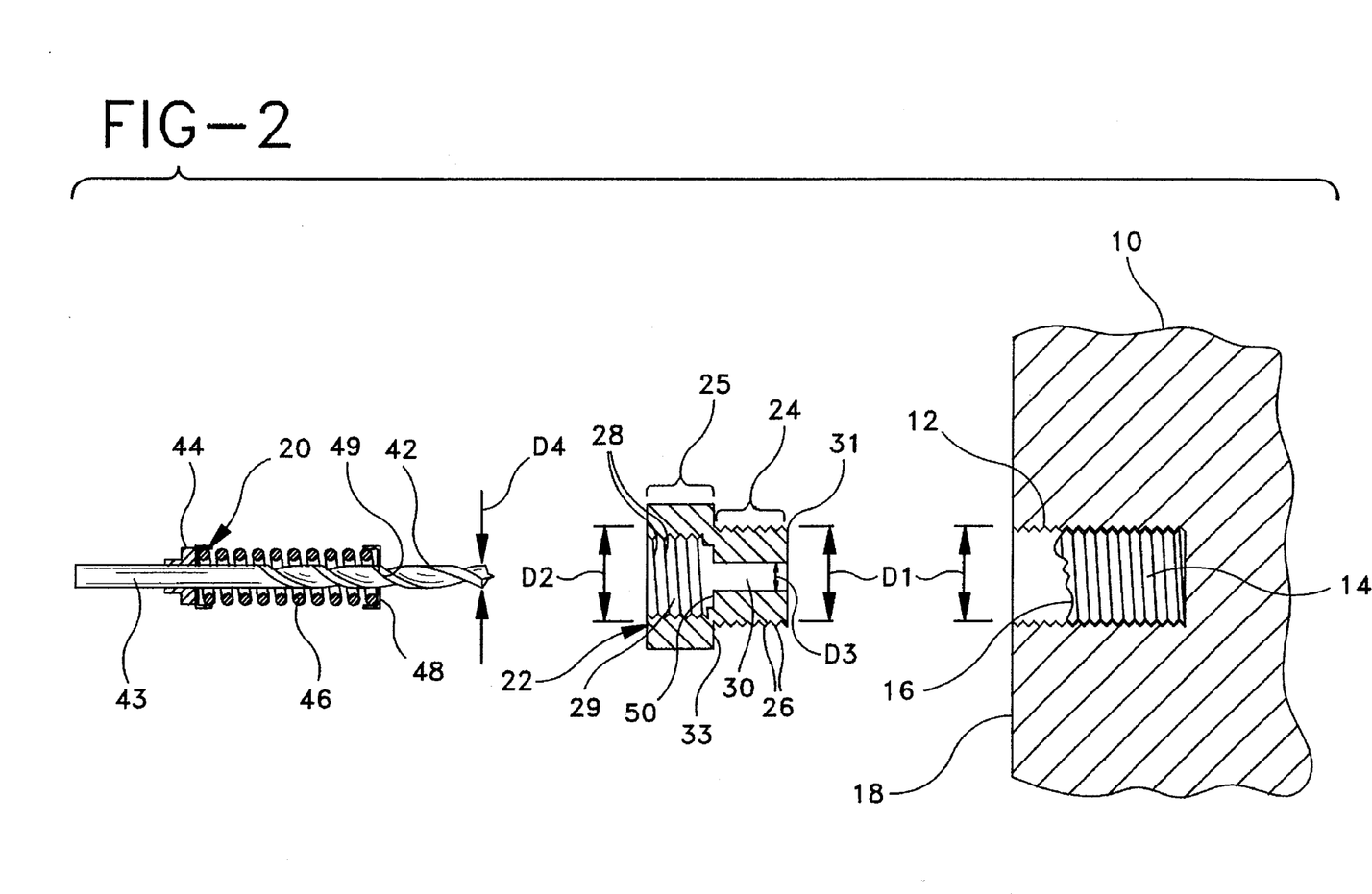
FIG. 2 is an exploded view of the embodiment shown in FIG. 1 with the collar member being cross-sectioned and viewed along section line 2—2.

Referring to FIG. 2, it can be seen that the collar member 22 has an exterior threaded region 24 and an interior threaded region 25. The threaded diameter D1 of the exterior threaded region 24 is the same as the threaded diameter D2 of the interior threaded region 25. Additionally, the threads 26 on the exterior threaded region 24 have the same thread size and pitch as the threads 28 on the interior threaded region 25. The interior threaded region 25 defines a central circular aperture 29. The exterior threaded region 24 also defines a central circular aperture 30 having a diameter D3. For a purpose to be later described, the diameter D3 of the aperture 30 is slightly wider than the diameter D4 of the drill bit 42 contained within the drill bit assembly 20. The aperture 30 defined by the exterior threaded region 24 is not threaded, but is rather smooth. Additionally, in the preferred embodiment, the collar member 22 is preferably made of a tool grade steel that is highly hardened.

The threaded diameter, pitch and thread size of the exterior threaded region 24 matches the threaded diameter, pitch and thread size of the threaded bore 12. Accordingly, the exterior threaded region 24 of the collar member 22 may be screwed into the threaded bore 12 until the bottom surface 31 of the exterior threaded region 24 either abuts against the top surface 16 of the broken bolt 14 or the bottom surface 33 of the interior threaded region 25 abuts against the face surface 18 of the bored object 10. The small aperture 30 of the exterior threaded region 24 is concentrically positioned along the longitudinal axis of the collar member 22. As such, the small aperture 30 aligns over the exact center of the broken bolt 14 as the collar member 22 is advanced into the threaded bore 12.

The drill bit assembly 20 includes a drill bit 42 having diameter D4. A spring stop collar 44 is firmly affixed to the drill bit 42 at a point on the unfluted shaft region 43 of the drill bit 42. The spring stop collar 44 engages and retains one end of a return spring 46. The return spring 46 extends forward around the drill bit 42 but does not engage the drill bit 42 in any manner other than through the spring stop collar 44. An abutment plate 48 is attached to the return spring 46 at the end of the spring opposite the spring stop collar 44. The abutment plate 48 is firmly affixed to the return spring 46 but does not engage the drill bit 42. Rather, the abutment plate 48 is annular in shape and defines a central aperture 49. The drill bit 42 passes through the central aperture 49, thereby extending beyond the abutment plate 48.

OPERATION OF THE FIRST EMBODIMENT

Figure 3:
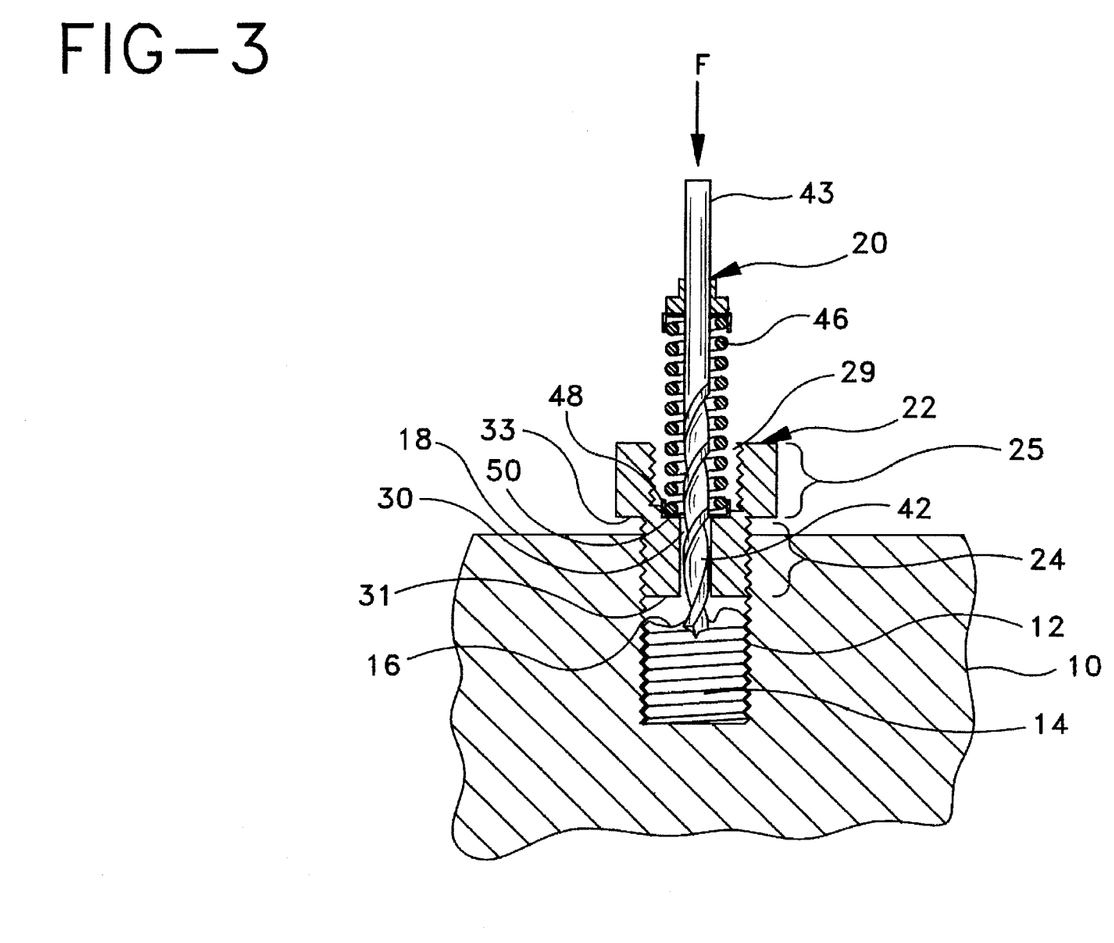
FIG. 3 shows the embodiment of FIG. 1 in use while drilling a hole in a broken element.

Referring to FIG. 3 in conjunction with FIG. 2, it can be seen that when a broken bolt 14 is within a threaded bore 12 and the top surface 16 of the broken bolt 14 does not extend out of the threaded bore 12, the exterior threaded region 24 of the collar member 22 is threaded into the threaded bore 12. If the top surface 16 of the broken bolt 14 is close to the face surface 18 of the object 10 defining the threaded bore 12, as is shown in FIG. 3, the collar member 22 is threaded into the bore 12 until the bottom surface 31 of the collar member 22 abuts against the top surface 16 of the broken bolt 14. If the top surface 16 of the broken bolt 14 were deep within the threaded bore 12, the collar member 22 would be threaded into the bore 12 until the bottom surface 33 of the interior threaded region 25 abutted against the face surface 18 of the bored object 10. Once threaded into the bore 12, the small aperture 30 within the exterior threaded region 24 is concentrically aligned over the center of the broken bolt 14. Similarly, the central aperture 29 defined by the interior threaded region 25 also concentrically aligns with both the small aperture 30 and the center of the broken bolt 14.

The non-fluted shaft 43 of the drill bit 42 is coupled to a drill in a conventional manner. Once coupled, the drill bit assembly 20 is advanced into the collar member 22. The tip of the drill bit 42 passes through the interior threaded region 25 and extends into the small aperture 30 defined by the exterior threaded region 24. The return spring 46 and the abutment plate 48 pass into the aperture 29 defined by the interior threaded region 25 until the abutment plate 48 engages the transition surface 50 in between the aperture 29 of the interior threaded region 25 and the small aperture 30 of the exterior threaded region 24.

The drill bit 42 can be advanced through the collar member 22 by applying a force F to the drill bit 42. As the drill bit 42 is advanced through the collar member 22, the return spring 46 becomes compressed in between the abutment plate 48 and the spring stop collar 44. The compression of the return spring 46 therefore provides a bias in opposition to the force F that acts to retract the drill bit 42 into the collar member 22. The abutment plate 48 has the same general diameter as does the transition surface 50 defined within the interior threaded region 25. Accordingly, the aperture 29 of the interior threaded region 25 retains the abutment plate 48 and holds the abutment plate 48 concentrically aligned with the longitudinal axis of the collar member 22. The diameter D3 of the small aperture 30 defined by the exterior threaded region 24 is only slightly larger than the diameter D4 of the drill bit 42. As such, the small aperture 30 within the exterior threaded region 24 holds the drill bit 42 straight, preventing the drill bit 42 from bending away from its nominal concentric position.

As the drill bit 42 is advanced through the collar member 22, the tip of the drill bit 42 engages the top surface 16 of the broken bolt 14 and begins to drill a hole down the center of the broken bolt 14, even if the top surface 16 of the broken bolt 14 is highly uneven. The presence of the drill bit 42 in the collar member 22 prevents the drill bit 42 from wandering. Accordingly, the drill bit 42 drills a hole directly down the center of the broken bolt 14. Once the hole is drilled, the force F is removed and the return spring 46 retracts the drill bit 42 out of the broken bolt 14. The drill bit assembly 20 is then removed from the collar member 22 and the collar member 22 is removed from the threaded bore 12. The broken bolt 14 can then be removed by any prior art bolt extraction device that requires a hole be drilled in a broken bolt.

Figure 4:
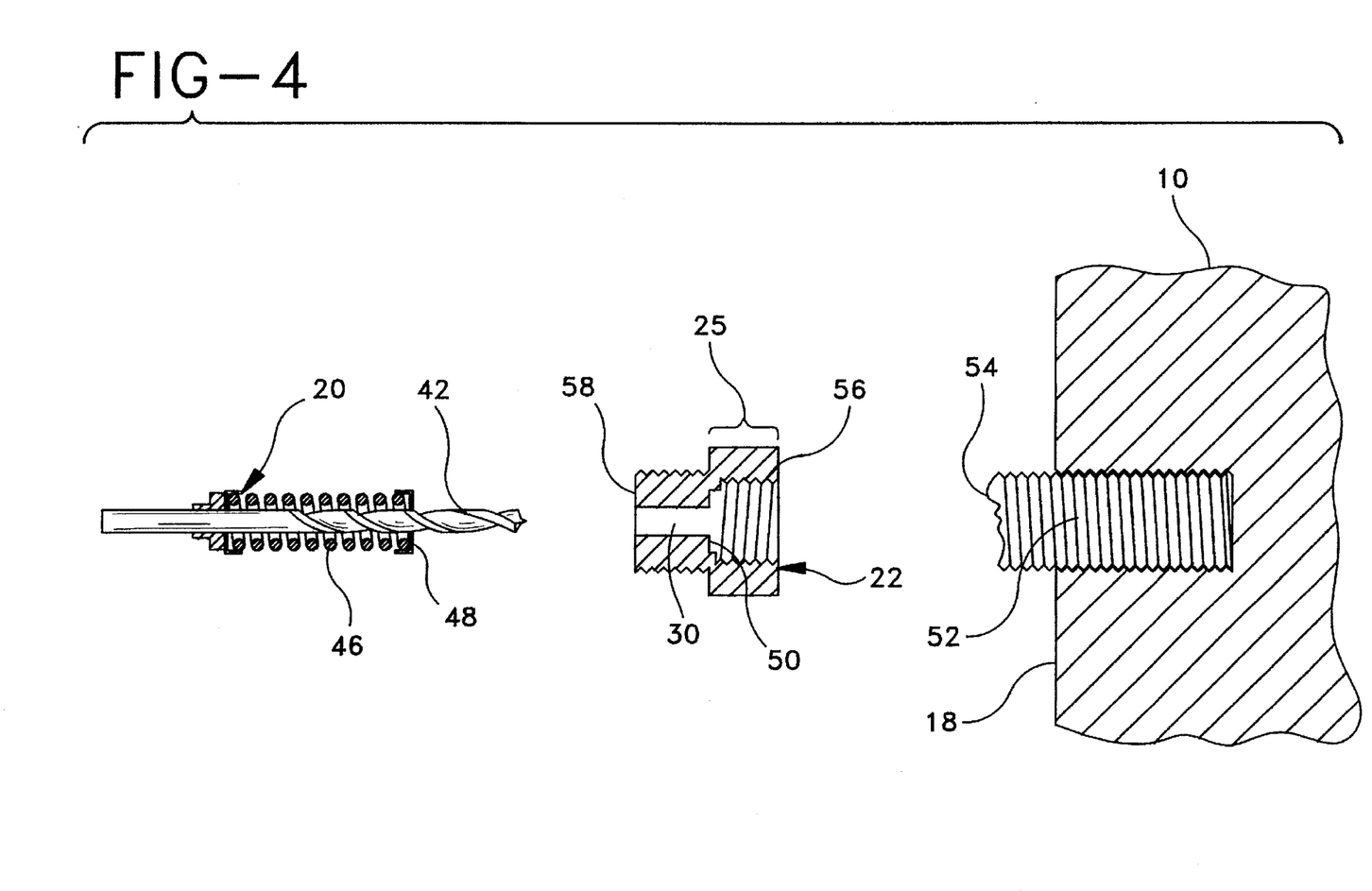
FIG. 4 shows the embodiment of FIG. 1, in an exploded presentation, in conjunction with a broken element that extends out of a bore.
Figure 5:
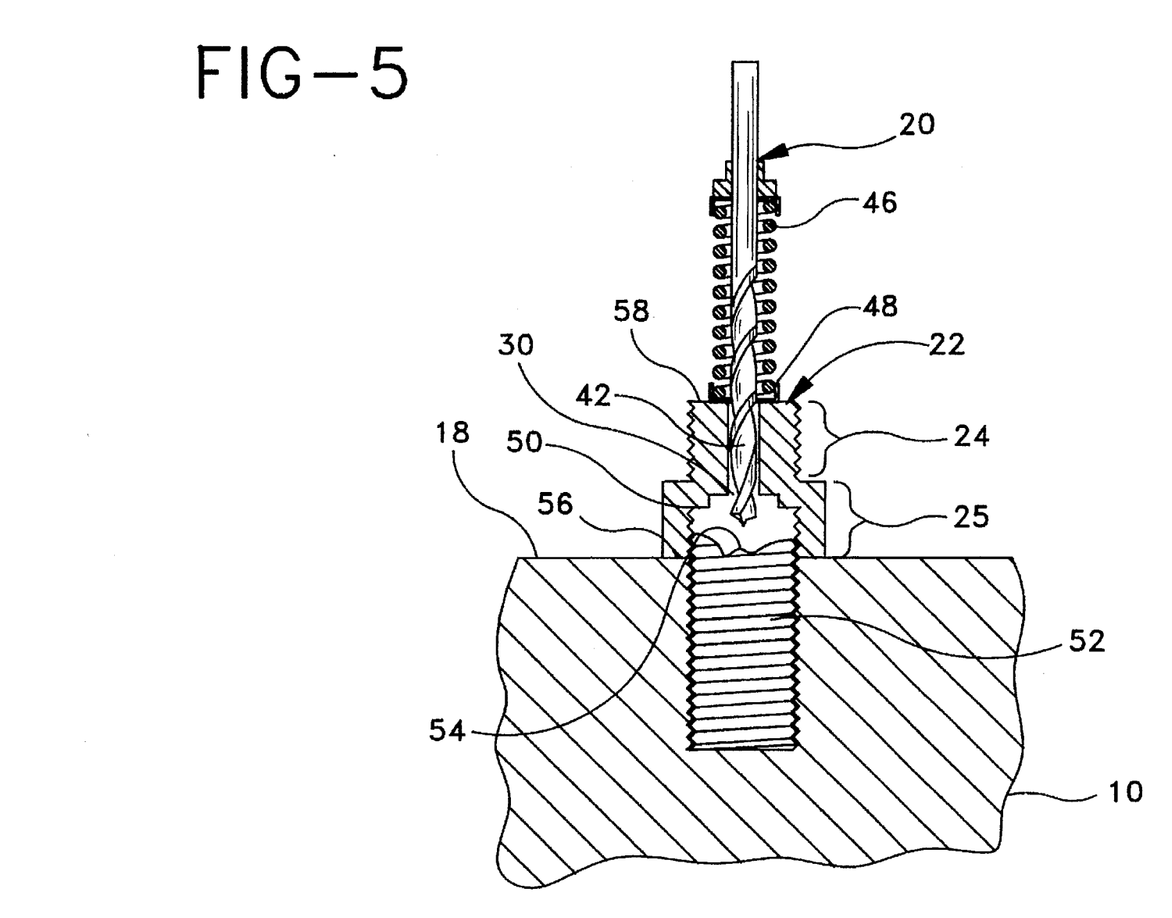
FIG. 5 shows the embodiment of FIG. 4 in use while drilling a hole in a broken element.

Referring to FIGS. 4 and 5, it can be seen that when a broken bolt 52 extends above the face surface 18 of a bored object 10, the collar member 22 is inverted so that the threaded interior region 25 threads onto the portion of the broken bolt 52 that extends above the bored object 10. The exterior threaded region 15 of the collar member 22 is threaded onto the broken bolt 52 until the transition surface 50 in between the aperture 29 of the interior threaded region 25 and the small aperture 30 of the exterior threaded region abuts against the top surface 54 of the broken bolt 52. Alternatively, if the broken bolt is not that long, the collar member 22 is threaded onto the broken bolt 52 until the end surface 56 of the collar member 22 abuts against the face surface 18 of the bored object 10.

Once the collar member 22 is in place, the drill bit 42 is advanced through the small aperture 30 in the exterior threaded region 24 of the collar member 22. As the drill bit 42 is advanced, the abutment plate 48 contacts the end surface 56 of the collar member 22, thereby compressing the return spring 46. The drill bit 42 is guided by the small aperture 30, wherein the drill bit 42 contacts and drills a hole in the center of the broken bolt 52. After the hole is drilled, the drill bit assembly 20 and the collar member 22 are removed and the bolt is removed with any prior art bolt extraction device that requires a hole be drilled in a broken bolt.

In the embodiment shown and described in FIGS. 1–5, the collar member 22 was shown having regular machine threads in the interior threaded region 25 and the exterior threaded region 24. Such a threading is merely exemplary and it should be understood that the simple machine threads can be replaced with cutting threads wherein the interior threaded region and exterior threaded region would act as a tap and die. As a result, if the exterior threaded region was advanced into a bore, the exterior threaded region would cut its own thread as it was advanced. Similarly, if the interior threaded region was advanced over the shaft of a broken bolt, the interior threaded region would cut its own thread onto the shaft.

Second Preferred Embodiment

Figure 6:
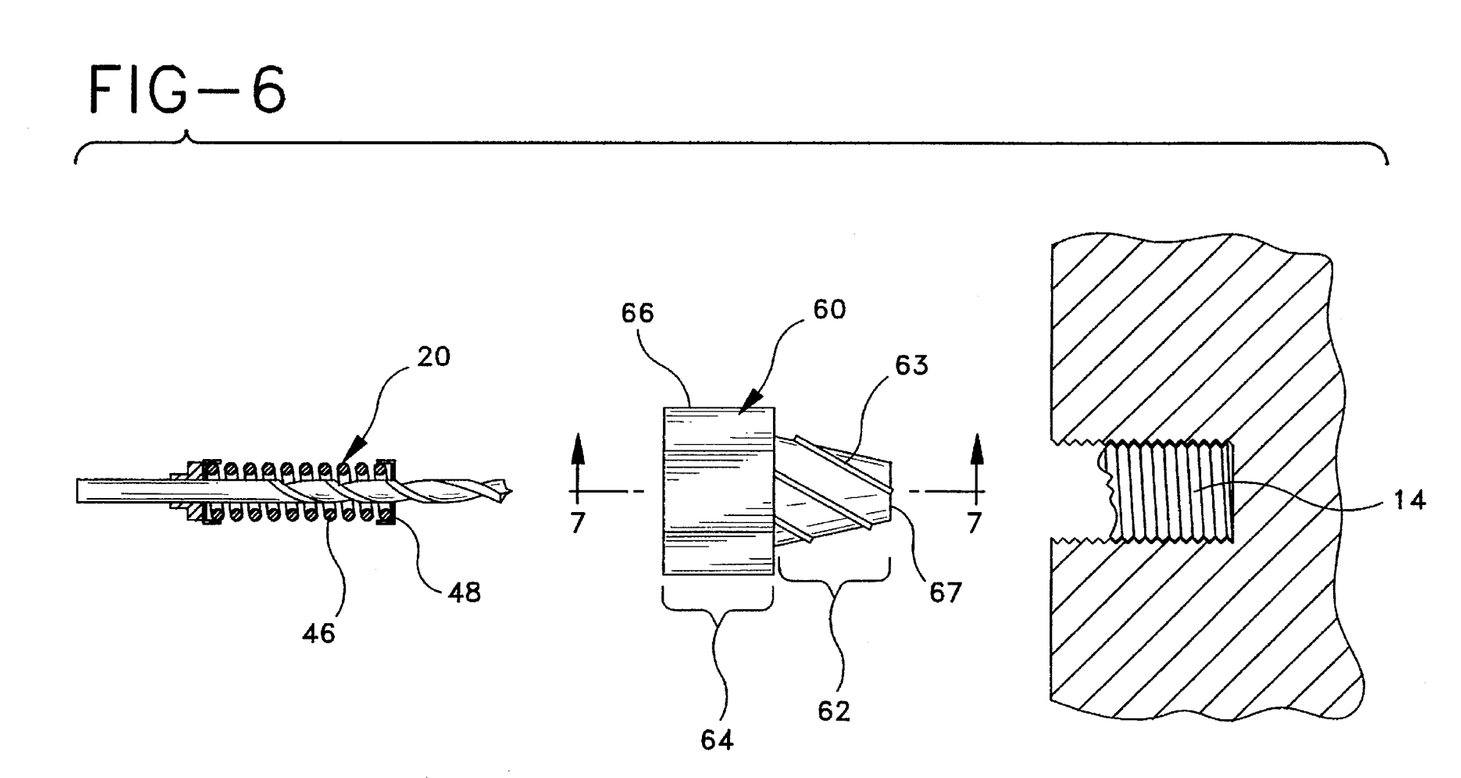
FIG. 6 is an exploded view of a second preferred embodiment of the present invention, shown in conjunction with an object that defines a bore, wherein an element is broken within the bore.
Figure 7:
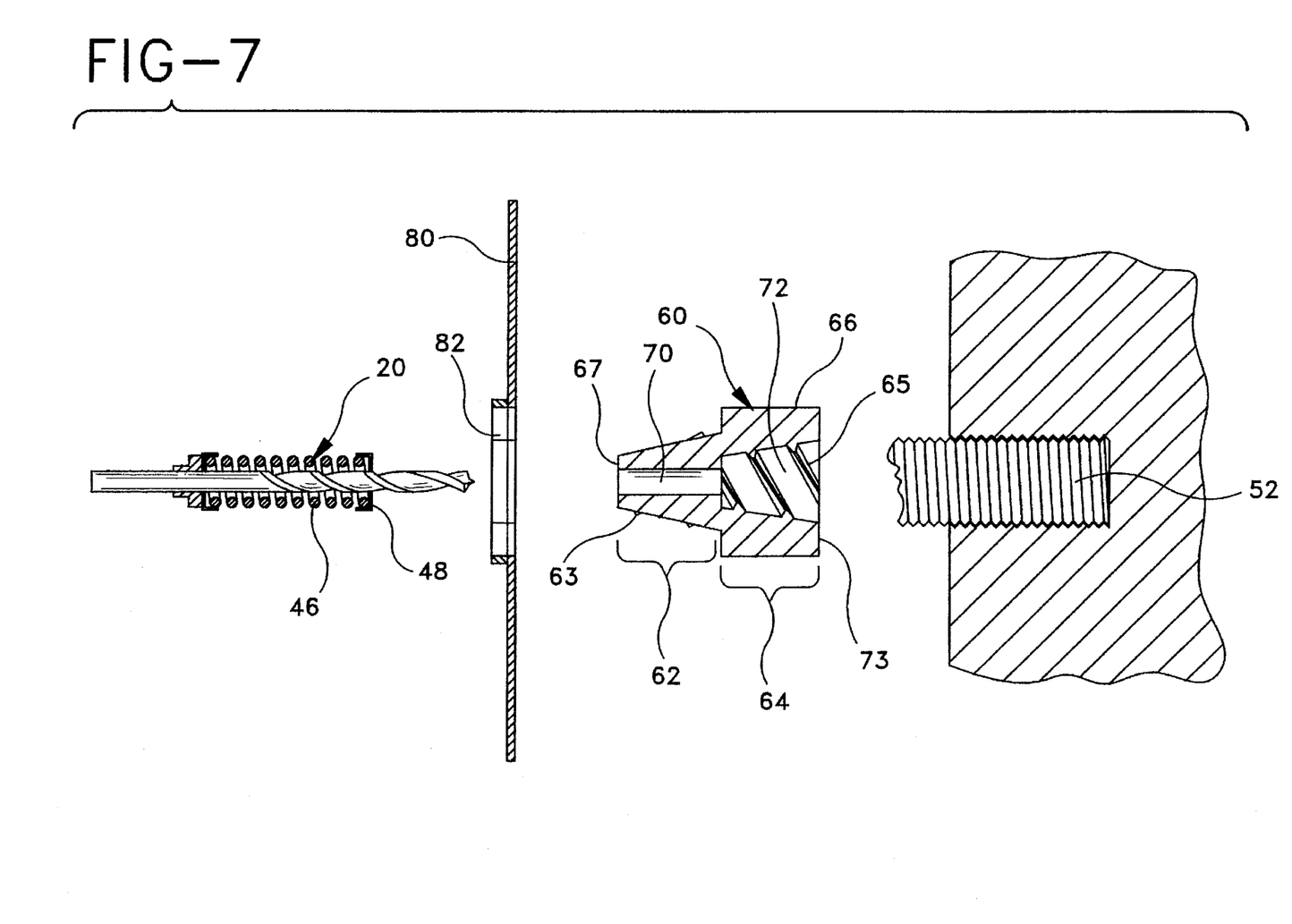
FIG. 7 is an exploded view of the embodiment shown in FIG. 6 with the collar member being cross-sectioned and viewed along section line 6—6.

Referring to FIG. 6 and 7, a second embodiment of the present invention is shown having a drill bit assembly 20 and a collar member 60. The drill bit assembly 20 is the same as in the previously described embodiment. As such, the same numbers shall be used in identifying the components of the drill bit assembly 20 and the drill bit assembly 20 itself, need not be described again.

The collar member 60 has a first region 62 with external cutting taps 63 and a second region 64 with internal cutting taps 65. The exterior 66 of the second region 64 is shaped like a hexagonal nut to facilitate the collar member 60 being engaged and turned by a wrench. The first region 62 of the collar member 60 is tapered, whereby the end surface 67 of the first region 62 is its most narrow point. The external cutting taps 63 follow the tapered contour of the first region 62 in a helical progression. A small aperture 70 is defined within the center of the first region 62. The small aperture 70 is concentrically disposed along the longitudinal axis of the collar member 60 and has a diameter just slightly larger than the diameter of the drill bit 42 in the drill bit assembly 20.

The second region 64 of the collar member 60 defines a tapered cavity 72. The tapered cavity 72 has its widest point along the end surface 73 of the collar member 60. The tapered cavity 72 communicates with the small aperture 70 within the first region 62, wherein both the tapered cavity 72 and the small aperture 70 are concentrically aligned. The internal cutting taps 65 follow the tapered contour of the tapered cavity 72, advancing across the tapered contour in a helical progression.

Operation of the Second Embodiment

In FIG. 6 a broken bolt 14 is shown broken below the surface. For such a circumstance, the first region 62 is turned into the bore 12 until the external cutting taps 63 on the first region 62 cut into the bore 12 and hold the first region 62 of the collar member 60 in a set position within the bore 12. The taper of the first region 62 causes the small aperture 70

(FIG. 7) defined by the first region 62 to align over the center of the broken bolt 14.

The drill bit assembly 20 is advanced into the second region 64 of the collar member 60. The tip of the drill bit 42 passes through the second region 64 and extends into the small aperture 70 (FIG. 7) defined by the first region 62. The abutment plate 48 and return spring 46 pass into the tapered cavity 72 (FIG. 7) defined by the second region 64 of the collar member 60. The abutment plate 48 engages the internal cutting taps 65 (FIG. 7) within the tapered cavity 72 whereby the internal cutting taps 65 hold the abutment plate 48 in a position concentrically disposed around the longitudinal axis of the collar member 60.

The drill bit 42 can be advanced through the collar member 60 by applying a force F to the drill bit assembly 20. Accordingly, as the drill bit 42 is advanced through the small aperture 30 defined by the first region 62, the drill bit 42 cuts a hole down the center of the broken bolt 14. The small aperture 30 acts as a guide to the drill bit 42, thereby preventing the drill bit 42 from bending or wandering away from the center of the broken bolt 14. After the hole is drilled, the drill bit assembly 20 and the collar member 60 are removed and the broken bolt 14 is removed with any prior art bolt extractor device that requires a hole be drilled in a broken bolt.

Referring to FIG. 7, it can be seen that when a broken bolt 52 extends above the surface, the collar member 60 is inverted so that the second region 64 of the collar member 60 passes over the broken bolt 52. The internal cutting taps 65 within the tapered cavity 72 cut into the broken bolt 52, thereby retaining the collar member 60 in place concentrically aligned around the longitudinal axis of the broken bolt 52. Once the collar member 22 is in place, the drill bit 42 is advanced through the small aperture 70 in the first region 62 of the collar member 60. As the drill bit 42 is advanced, the drill bit 42 is guided by the small aperture 70, wherein the drill bit 42 contacts and drills a hole in the center of the broken bolt 52. After the hole is drilled, the drill bit assembly 20 and the collar member 60 are removed and the broken bolt is removed with any prior art bolt extraction device that requires a hole be drilled in a broken bolt.

An alignment bracket 80 may optionally be used to help secure the collar member 60 in place. The optional alignment bracket 80 defines a hexagonal aperture 82 that passes over the hexagonal outer surface of the second region 64 of the collar member 60. The alignment bracket 80 prevents the collar member 60 from turning and provides a means through which the collar member 60 can be clamped to the face surface 18 of the bored object.

It will be understood that the embodiments described above are merely exemplary and are not considered the only embodiments that the present invention may take. It is also understood that a person skilled in the art may make numerous alterations and modifications to the embodiments shown utilizing functionally equivalent components to those described. All such alterations and modifications are intended to be included within the scope of the present invention as set forth in the appended claims.

What is claimed is:

1. A device for drilling a hole in the center of a broken element that is engaged within a bore, wherein the bore extends to a predetermined depth below a given surface, said device comprising:

a collar member that defines an open central channel, said collar member having a male region and a female region, wherein said male region has a first engagement means disposed thereon for engaging the bore below the surface and said female region has a second engagement means disposed therein for engaging the broken element, whereby said collar member can be oriented to enable said male region to engage the bore and align said open channel over the center of the broken element when the broken element is broken below the surface, and said collar member can be oriented to enable said female region to engage the broken element and align said open channel over the center of the broken element when the broken element is broken above the surface; and a drill bit sized to fit within said open channel, whereby said open channel directs said drill bit toward the center of the broken element and guides said drill bit as said drill bit drills a hole in the center of the broken element.

2. The device according to claim 1, further including a spring means disposed between said drill bit and said collar member for biasing said drill bit away from the broken element.

3. The device according to claim 1, wherein the bore is threaded and said first engagement means disposed on said male region is threading that enables said male region to be threaded into said bore.

4. The device according to claim 1, wherein the broken element is a threaded shaft and said second engagement means disposed within said female region is threading that enables said female region to be threaded onto said threaded shaft.

5. The device according to claim 1, wherein said first engagement means disposed on said male region includes at least one cutting tooth that engages the bore when said male region is positioned within the bore.

6. The device according to claim 5 wherein said first engagement means includes multiple cutting teeth having helical flutes disposed therebetween.

7. The device according to claim 1, wherein said second engagement means disposed within said female region includes at least one cutting tooth that engages the broken element when the broken element extends into the female region.

8. The device according to claim 7, wherein said second engagement means includes multiple cutting teeth having helical flutes disposed therebetween.

9. The device according to claim 8 wherein said female region defines a tapered cavity that tapers downwardly from a wide opening.

10. The device according to claim 5 wherein said male region is tapered.

11. The device according, to claim 1, wherein said collar member further includes a nut shape surface thereon whereby said collar member can be readily engaged with and rotated by a wrench.

12. A guide device for guiding a drill bit down the center of a broken element engaged within a threaded bore, wherein the bore extends a predetermined distance below a given surface, said guide device comprising:

a metal body having a first end and an opposite second end wherein an open channel extends from said first end to said second end;

an external region on said metal body having threading disposed thereon for engaging the threaded bore, wherein said open channel is aligned over the center of the broken element and guides the drill bit onto the center of the broken element.

13. A method of drilling a hole in the center of a broken bolt engaged within a bore, comprising the steps of:

providing a drill guide having an open channel extending therethrough;

threading said drill guide onto said broken bolt, wherein said open channel is aligned over the center of the broken bolt;

advancing a drill bit through said open channel, whereby said open channel guides the drill bit into the center of the broken bolt.

* * * * *